United States Patent [19]
Rigsby

[11] Patent Number: 5,528,218
[45] Date of Patent: Jun. 18, 1996

[54] ELECTRONIC SELF-CANCELING TURN SIGNAL DEVICE

[75] Inventor: Bruce S. Rigsby, Charlestown, Ind.

[73] Assignee: Grote Industries, Inc., Madison, Ind.

[21] Appl. No.: 916,635

[22] Filed: Jul. 22, 1992

[51] Int. Cl.⁶ .................................................. B60Q 1/00
[52] U.S. Cl. ........................ 340/475; 340/476; 340/477; 200/61.27; 200/61.30; 200/61.35
[58] Field of Search ..................................... 342/475, 476, 342/477; 340/815.3; 200/61.27, 61.28, 61.29, 61.30, 61.31, 61.32, 61.33, 61.34, 61.35

[56] References Cited

U.S. PATENT DOCUMENTS

| | | | |
|---|---|---|---|
| 3,519,986 | 9/1966 | Roucher | 340/476 |
| 3,555,506 | 10/1966 | Daws | 340/477 |
| 3,555,507 | 5/1967 | Burson, Jr. | 340/477 |
| 4,333,071 | 6/1982 | Kira et al. | 200/61.31 |
| 4,384,270 | 5/1983 | Morita et al. | 200/61.35 |
| 4,638,290 | 1/1987 | Wagner | 200/61.35 |

*Primary Examiner*—John K. Peng
*Assistant Examiner*—Edward Lefkowitz
*Attorney, Agent, or Firm*—Woodard, Emhardt, Naughton Moriarty & McNett

[57] ABSTRACT

An electronic self-canceling turn signal device for use with a motor vehicle, and most advantageously a semi-tractor/trailer, having turn indicators or indicator lights providing numerous features. The electronic self-canceling turn signal device provides for the driver of the vehicle to make a wide or sweeping turn maneuver in an indicated direction by initially turning the vehicle in a direction opposite or counter to the indicated turn direction and then executing the indicated turn without canceling the indicated turn signal. The electronic self-canceling turn signal device further provides a time delay between the point in time a tractor completes an indicated turn and the time that the electronic self-canceling device cancels the indicated turn signal so that trailers pulled by the tractor will complete the indicated turn before the turn signal is canceled.

33 Claims, 5 Drawing Sheets

ELECTRONIC SELF-CANCELING TURN SIGNAL DEVICE

BACKGROUND OF THE INVENTION

The present invention relates to turn signal devices for activating the turn signal or indicator lights of a motor vehicle, and more particularly an electronic self-canceling turn signal device.

Self-canceling mechanical and electronic turn signal devices for activating vehicle indicator lights are, per se, known. These known designs, however, have a number of drawbacks. Mechanical switching devices are prone to wear due to the great amount of use the device endures. Mechanical switching devices of conventional types also are often damaged due to attempts by the vehicle operator to overcome switching deficiencies by holding the switching device in positions contrary to the bias of the switching means, such as, for example, holding the turn indicator switch in the 'on' position through a turn when the switch would normally return to the 'off' position.

Known turn signal devices do not provide for wide or sweeping turns made by vehicles such as semi-tractor/trailer trucks wherein the operator must turn the steering wheel in the direction opposite the intended or actual turn before executing the actual turn. In the above example, known self-canceling turn indicator switching means cancel the turn indicator function prematurely, at the first turn of the steering wheel in the direction opposite the indicated turn.

In addition, known turn indicator turn used with, for example, semi-trucks tend to cancel the turn indicators when the tractor has completed the turn but before the trailer has completed the turn.

SUMMARY OF THE INVENTION

The electronic self-canceling turn signal device of the present invention provides solutions to the above-mentioned problems. The present invention also provides an electronic self-canceling turn signal device which allows for the simultaneous operation of the various other functions of the indicator lights, such as indicating braking of the vehicle and operation of the indicator lights indicating a hazard warning.

The present invention also provides an electronic self-canceling turn signal device having a delay function which allows for a trailer, if any, attached to the vehicle to complete a turn before the turn indicator function is canceled.

The present invention also provides an electronic self-canceling turn signal device which allows a vehicle to execute a wide or sweeping turn without canceling the turn indicator function.

The device of the present invention further provides left and right turn indicator functions which override the braking indicator function so that the rear indicator light of the vehicle which is flashing to indicate a turn will continue to flash even when the vehicle's brakes are applied while continuously flashing the front indicator light indicating the turn, and operating the opposite rear indicator light to indicate braking of the vehicle.

The device also provides a hazard function which flashes the four indicator lights and which overrides or cancels the turn indicator functions, but will leave the rear braking indicator lights functional to indicate vehicle braking in the event the vehicle brakes are applied while the hazard function is operating.

In one embodiment, the present invention provides an electronic self-canceling turn signal device for a motor vehicle having left front, left rear, right front and right rear indicator lights comprising left blinker means operatively associated with the left front and left rear indicator lights for selectively illuminating the left front and left rear indicator lights in a blinking manner, left switch means operatively associated with the left blinker means for controlling the activation and deactivation of the left blinker means, left turn indicator demand means operatively associated with the left switch means for selectively controlling the activation and deactivation of the left switch means, turn indicator canceling means operatively associated with the steering mechanism of the vehicle to sense motion of the vehicle steering mechanism, right blinker means operatively associated with the right front and right rear indicator lights for selectively illuminating the right front and rear indicator lights in a blinking manner, right switch means operatively associated with the right blinker means for controlling the activation of the right blinker means, right turn indicator demand means operatively associated with the right switch means for selectively controlling the activation and deactivation of the right switch means, and timer means operatively associated with the turn indicator canceling means for triggering the timer at a predetermined motion of the steering mechanism and operatively associated with the left switch means and the right switch means for only deactivating the left and right switch means after a predetermined time.

In another embodiment, the present invention provides an electronic self-canceling turn signal device for motor vehicles having left front, left rear, right front, right rear indicator lights comprising left blinker means operatively associated with the left front and left rear indicator lights for selectively illuminating the left front and left rear indicator lights in a blinking manner, left switch means operatively associated with the left blinker means for controlling the activation and deactivation of the left blinker means, left turn indicator demand means operatively associated with the left switch means for selectively controlling the activation and deactivation of the left switch means, right blinker means operatively associated with the right front and right rear indicator lights for selectively illuminating the right front and right rear indicator lights in a blinking manner, right switch means operatively associated with the right blinker means for controlling the activation of the right blinker means, right turn indicator demand means operatively associated with the right switch means for selectively controlling the activation and deactivation of the right switch means, left turn indicator canceling means operatively associated with the steering mechanism of the vehicle for sensing a first motion of the steering mechanism, timer means operatively associated with the left turn indicator canceling means so that the left turn indicator canceling means triggers the timer means at a predetermined motion of the steering mechanism and operatively associated with the left switch means for only deactivating the left switch means after a predetermined time, right turn indicator canceling means operatively associated with the steering mechanism of the vehicle for sensing a second motion of the steering mechanism, and timer means operatively associated with the right turn indicator canceling means so that the right turn indicator canceling means triggers the timer means at a predetermined motion of the steering mechanism and operatively associated with the right switch means for only deactivating the right.

In yet another embodiment, the present invention provides an electronic self-canceling turn signal device for motor vehicles having left front, left rear, right front and right rear indicator lights comprising, left blinker means operatively associated with the left front and left rear indicator lights for selectively illuminating the left front and left rear indicator lights in a blinking manner, left switch means operatively associated with the left blinker means for controlling the activation and deactivation of the left blinker means, left turn indicator demand means operatively associated with the left switch means for selectively controlling the activation and deactivation of the left switch means, right blinker means operatively associated with the right front and right rear indicator lights for selectively illuminating the right front and right rear indicator lights in a blinking manner, right switch means operatively associated with the right blinker means for controlling the activation of the right blinker means, right turn indicator demand means operatively associated with the right switch means for selectively controlling the activation and deactivation of the right switch means, left turn indicator canceling means operatively associated with the steering mechanism of the vehicle for sensing a left then right turn motion of the steering mechanism and operatively associated with the left switch means for selectively only deactivating the left switch means when the vehicle steering mechanism is displaced in a left turn motion, and right turn indicator canceling means operatively associated with the steering mechanism of the vehicle for sensing a right turn motion of the steering mechanism and operatively associated with the right switch means for selectively only deactivating the right switch means when the vehicle steering mechanism is displaced in a right turn left turn motion.

BRIEF DESCRIPTION OF THE DRAWINGS

The various objectives and features of the present invention will become even more clear upon reference to the following discussion in conjunction with the accompanying drawings wherein like labels refer to like parts throughout the figures and in which.

DETAILED DESCRIPTION OF THE EMBODIMENTS

Figure 1:
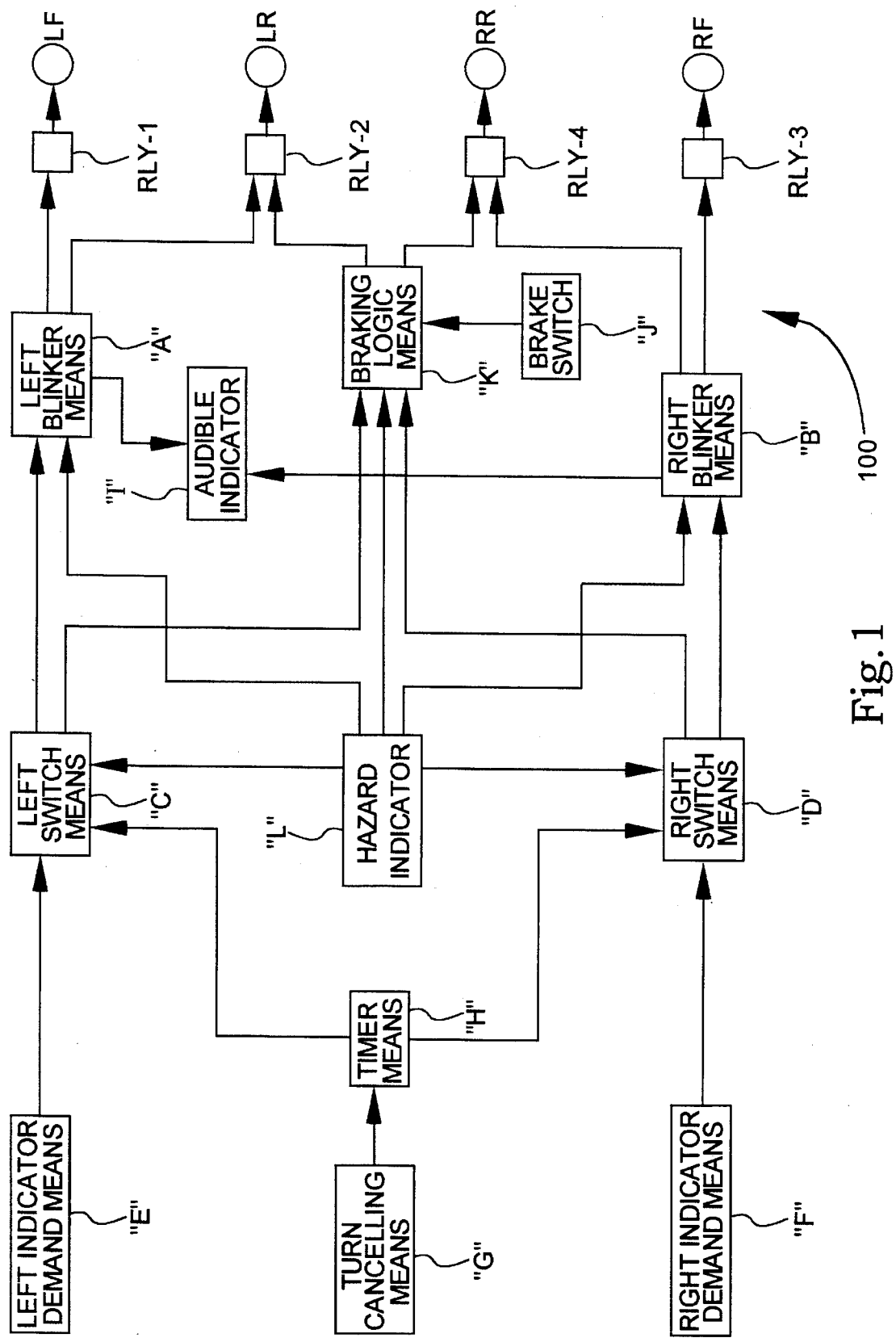
FIG. 1 is a block diagram illustrating one embodiment of the electronic self-canceling turn signal device of the present invention.

With reference to FIG. 1, there is shown in block diagram an embodiment of an electronic self-canceling turn signal device, generally denoted as the numeral 100, of the present invention for use with a motor vehicle, such as a tractor-trailer, having left front LF, left rear LF, right front RF, and right rear RR indicator lights. The electronic self-canceling turn signal device 100 comprises left blinker means "A" operatively associated with the left front indicator light LF and left rear indicator light LR of the vehicle for selectively illuminating the left front and left rear vehicle indicator lights in a blinking manner, and right blinker means "B" operatively associated with the right front indicator light RF and right rear indicator light RR of the vehicle for selectively illuminating the right front and right rear vehicle indicator lights in a blinking manner. The left blinker means "A" is operatively associated with the left switch means "C" which controls the activation and deactivation of the left blinker means "A", and the right blinker means "B" is operatively associated with right switch means "D" which controls the activation and deactivation of the right blinker means "B". Left turn indicator demand means "E" is operatively associated with the left switch means "C" for selectively controlling the activation and deactivation of the left switch means "C", and right turn indicator demand means "F" is operatively associated with the right switch means "D" for selectively controlling the activation and deactivation of the right switch means "D". Turn indicator canceling means "G" is operatively associated with the steering mechanism of the vehicle to sense motions of the vehicle steering mechanism. Timer means "H" is operatively associated with the turn indicator canceling means "G" so that the turn indicator canceling means "G" will trigger the timer means "H" at a predetermined motion of the vehicle steering mechanism and also operatively associated with both the left switch means "C" and right switch means "D" for deactivating the left and right switch means at a predetermined time after activation of the left and right switch means. The electronic self-canceling turn signal device 100 can also include audible indicator means "I" operatively associated with the left blinker means "A" and the right blinker means "B" for activation only when the left blinker means "A" or right blinker means "B" are activated to provide an audible signal to the vehicle driver that the indicator lights LF, LR, RF, RR are illuminated.

In operation of the turn signal device 100 discussed above, the vehicle driver manually activates either the left turn indicator demand means "E" or the right turn indicator demand means "F" to signal a turn in either the left or right direction. When the left turn indicator demand means "E" is activated by the vehicle driver, the left turn indicator demand means "E" sends a pulse activate signal to the left switch means "C", and the left switch means "C" sends a constant activation signal to the left blinker means "A" which, in turn, causes the left front light LF and left rear light LR to illuminate in a blinking manner indicating to others that the vehicle will be making a left turn.

When the vehicle operator moves the vehicle steering mechanism to make a left turn and then moves the steering mechanism to the right to straighten the vehicle, the turn indicator canceling means "G" sends a signal to the timer means "H" to activate or trigger the timer means "H". After the timer means "H" times-out, it sends a pulse deactivate signal to the left switch means "C" canceling the blinking illumination of the left front light LF and left rear light LR. Likewise, when the right turn indicator demand means "F" is activated by the vehicle driver, the right turn indicator demand means "D", and the right switch means "D" sends a constant activate signal to the right blinker means "B" which, in turn, causes the right front light RF and right rear light RR to illuminate in a blinking manner indicating to others that the vehicle will be making a right turn. When the vehicle operator moves the vehicle steering mechanism to make a right-hand turn and then moves the steering mechanism to the left to straighten the vehicle, the turn indicator canceling means "G" sends a signal to the timer means "H" to activate or trigger the timer means "H". After the timer means "H" times-out, it sends a pulse deactivate signal to the right switch means "D" canceling the blinking illumination of the right front light RF and right rear light RR. If the vehicle driver activates one or the other of the turn indicator demand means "E" or "F", but does not activate the turn indicator canceling means "G" the timer means "H" is not activated and the vehicle driver can cancel the turn indication of the blinking indicator lights LF, LR, or RF, RR by again activating the turn indicator demand means "E" or "F" which then sends a pulse deactivate signal to the appropriate switch means "C" or "D", respectively.

With continued reference to FIG. 1, the electronic self-canceling turn signal device 100 further comprises a first left transistor-controlled relay circuit RLY-1 operatively associated with the left front indicator light LF, a second left transistor-controlled relay circuit RLY-2 operatively associated with the left rear indicator light LR, a first right transistor-controlled relay circuit RLY-3 operatively associated with the right front vehicle light RF, and a second right transistor-controlled relay circuit RLY-4 operatively associated with the right rear vehicle light RR. A vehicle braking indicator means includes a momentary brake switch "J" operatively associated with the vehicle braking system and braking indicator switching logic means "K" operatively associated with the momentary brake switch "J" for sensing the on/off state of the momentary brake switch "J". The brake indicator logic means "K" is further operatively associated with the second left transistor-controlled relay circuit R-2 and with the second right transistor-controlled relay circuit RLY-4 for activating the second left transistor-controlled relay RLY-2 and the second right transistor-controlled relay RLY-4. In addition, the brake indicator logic means "K" is operatively associated with the left switch means "C" and the right switch means "D" to receive an input signal from the left and right switch means sensing the on/off state of the left and right switch means.

In operation, when the self-canceling turn signal device 100 is in operation illuminating one of the rear vehicle lights in a blinking manner indicating a turn as discussed above, and the vehicle operator applies the vehicle brakes, a signal from the activated one of the left and right switch means "A" or "B" is received by the braking indicator logic means "K", and the braking indicator logic means "K" sends a signal only to the rear vehicle light which is not illuminated in a blinking manner so that it is constantly illuminated to indicate to the following traffic that the vehicle is braking as well as turning. If the left and right switch means "A" and "B" are off, the braking indicator logic means "K" sends a signal to both the left rear light LR and right rear light RR so as to constantly illuminate both the rear lights indicating to the following traffic that the vehicle is braking but not turning.

Still referring to FIG. 1, the electronic self-canceling turn signal device 100 also comprises hazard indicator means "L" operatively associated with both the left blinker means "A" and the right blinker means "B".

When the hazard indicator means "L" is activated, it sends a signal to both the left and right blinker means to operate the left front light LF, left rear light LR, right front light RF, and right rear light RR all in a blinking manner.

Figure 2:
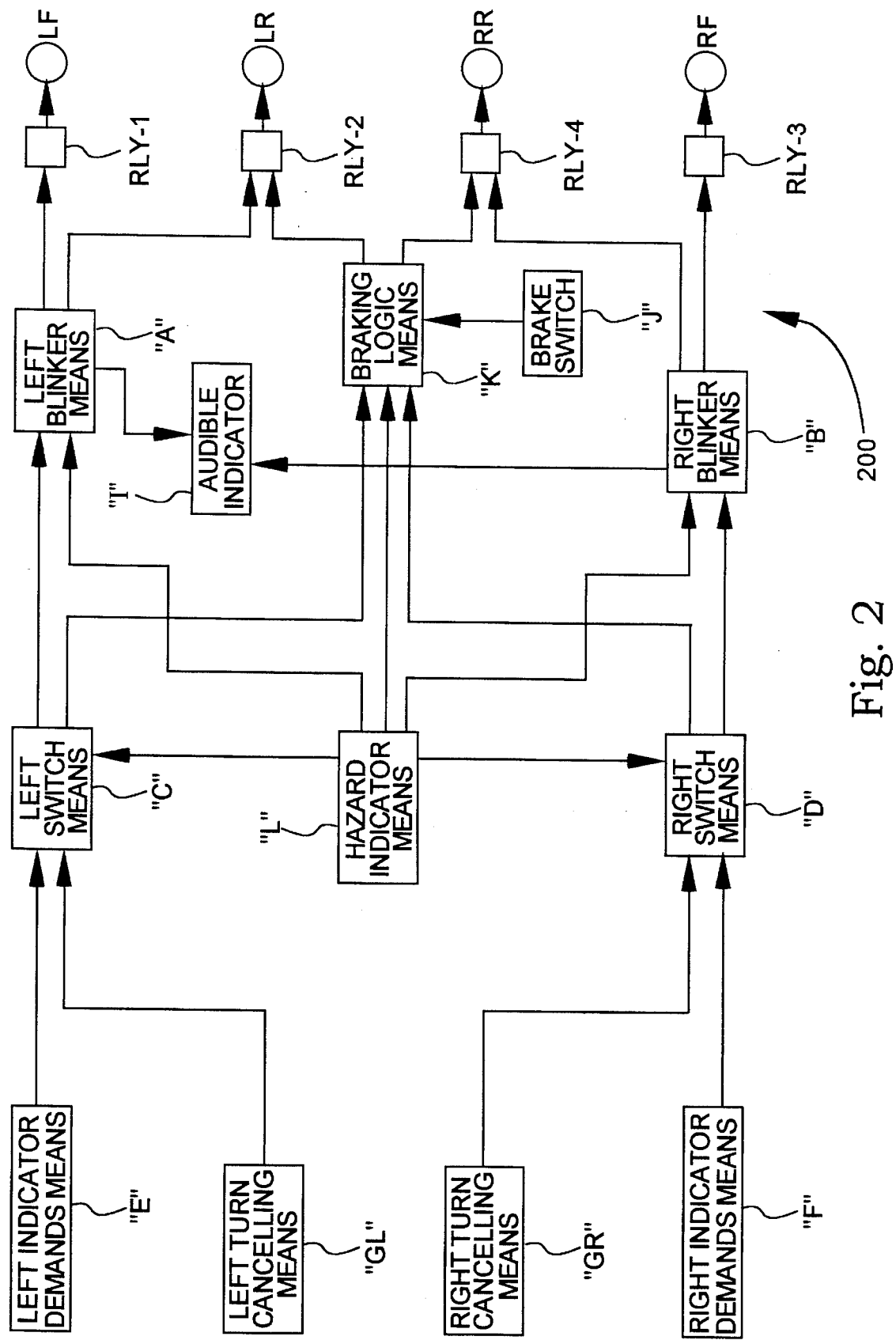
FIG. 2 is a block diagram illustrating another embodiment of the electronic self-canceling turn signal device of the present invention; and, FIG. 3 is composed of FIGS. 3A, 3B, and 3C, and is a schematic representation of the preferred embodiment of the electronic device of the present invention.

With reference to FIG. 2, there is shown in block diagram another embodiment of an electronic self-canceling turn signal device, generally denoted as the numeral 200, of the present invention for use with a motor vehicle, such as a tractor-trailer having left front LF, left rear LR, right front RF, and right rear RR indicator lights. The electronic self-canceling turn signal device 200 comprises left blinker means "A" operatively associated with the left front indicator light LF and left rear indicator light LR of the vehicle for selectively illuminating the left front and left rear vehicle indicator lights in a blinking manner, and right blinker means "B" operatively associated with the right front indicator light RF and right rear indicator light RR of the vehicle for selectively illuminating the right front and right rear vehicle indicator lights in a blinking manner. The left blinker means "A" is operatively associated with left switch means "C" which controls the activation and deactivation of the left blinker means "A", and the right blinker means "B" is operatively associated with the right switch means "D" which controls the activation and deactivation of the right blinker means "B". Left turn indicator demand means "E" is operatively associated with the left switch means "C" for selectively controlling the activation and deactivation of the left switch means "C", and right turn indicator demand means "F" is operatively associated with the right switch means "D" for selectively controlling the activation and deactivation of the right switch means "D". Left and right turn indicator canceling means "GL" and "GR", respectively, are operatively associated with the steering mechanism of the vehicle to sense positions of the vehicle steering mechanism. The left turn indicator canceling means GL is also operatively associated with the left switch means "C" for selectively only deactivating the left switch means "C" when the vehicle steering mechanism has been displaced in a left then right turn motion. The right indicator canceling means "GR" is also operatively associated with the right switch means "D" for selectively only deactivating the right switch means "D" when the vehicle steering mechanism has been displaced in a right turn left turn motion. The electronic self-canceling turn signal device 200 can also include audible indicator means operatively associated with the left blinker means "A" and the right blinker means "B" for activation only when the left blinker means "A" or right blinker means "B" are activated to provide an audible signal to the vehicle driver that the indicator lights LF, LR, RF, RR are being illuminated.

In operation of the turn signal device 200 discussed above, the vehicle driver manually activates either the left turn indicator demand means "E" or the right turn indicator demand means "F" to signal a turn in either the left or right direction. When the left turn indicator demand means "E" is activated by the vehicle operator, the left turn indicator demand means "E" sends a pulse activate signal to the left switch means "C", and the left switch means "C" sends a constant activation signal to the left blinker means "A" which, in turn, causes the left front light LF and left rear light LR to illuminate in a blinking manner indicating to others that the vehicle will be making a left turn. When the driver moves the vehicle steering mechanism in a left turn direction and the steering mechanism has moved left a sufficient amount and then right to straighten the vehicle, the left turn indicator canceling means "GL" sends a pulse deactivate signal to the left switch means "C" canceling the blinking illumination of the left front light LF and left rear light LR. This allows the driver to make a wide or sweeping left turn by initially moving the vehicle steering mechanism in a right turn direction before moving the steering mechanism to the left then right turn direction without canceling the blinking illumination of the left front LF and left rear LR indicator lights. The deactivate signal will only be sent when the steering wheel is rotated left then right in the left turn mode. Likewise, when the right turn indicator demand means "F" is activated by the vehicle driver, the right turn indicator demand means "F" sends a pulse activate signal to the right switch means "D", and the right switch means "D" sends a constant activation signal to the right blinker means "B" which, in turn, causes the right front light RF and right rear light RR to illuminate in a blinking manner indicating to others that the vehicle will be making a right turn. When the driver moves the vehicle steering mechanism in a right turn direction and the steering mechanism has moved right then left a sufficient amount, the right turn indicator canceling means "GR" sends a pulse deactivate signal to the right switch means "D" canceling the blinking illumination of the right front light RF and right rear light RR. This allows the driver to make a wide or sweeping right turn by initially moving the vehicle steering mechanism in a left turn direction before moving the steering mechanism to the right then left turn direction without canceling the blinking illumination of the right front RF and right rear RR indicator lights. The deactivate signal will only be sent when the steering wheel is rotated left then right in the left turn mode.

All of the other features of the electronic self-canceling turn signal device 200 are identical to the features of the electronic self-canceling turn signal device 100 and are identified by identical numerals. Therefore, for the sake of brevity, these other features will not be again discussed.

Figure 3A:
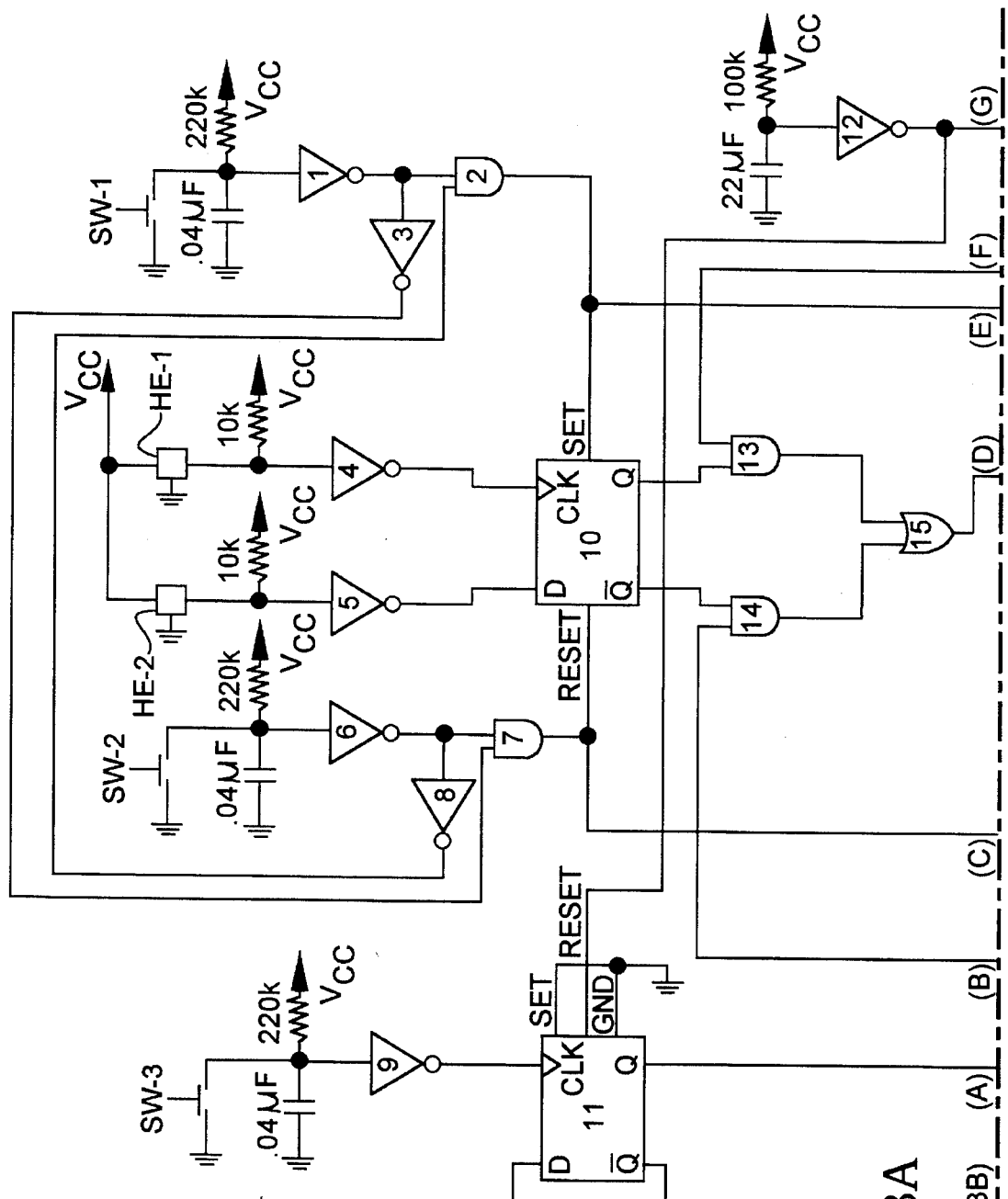
Figure 3B:
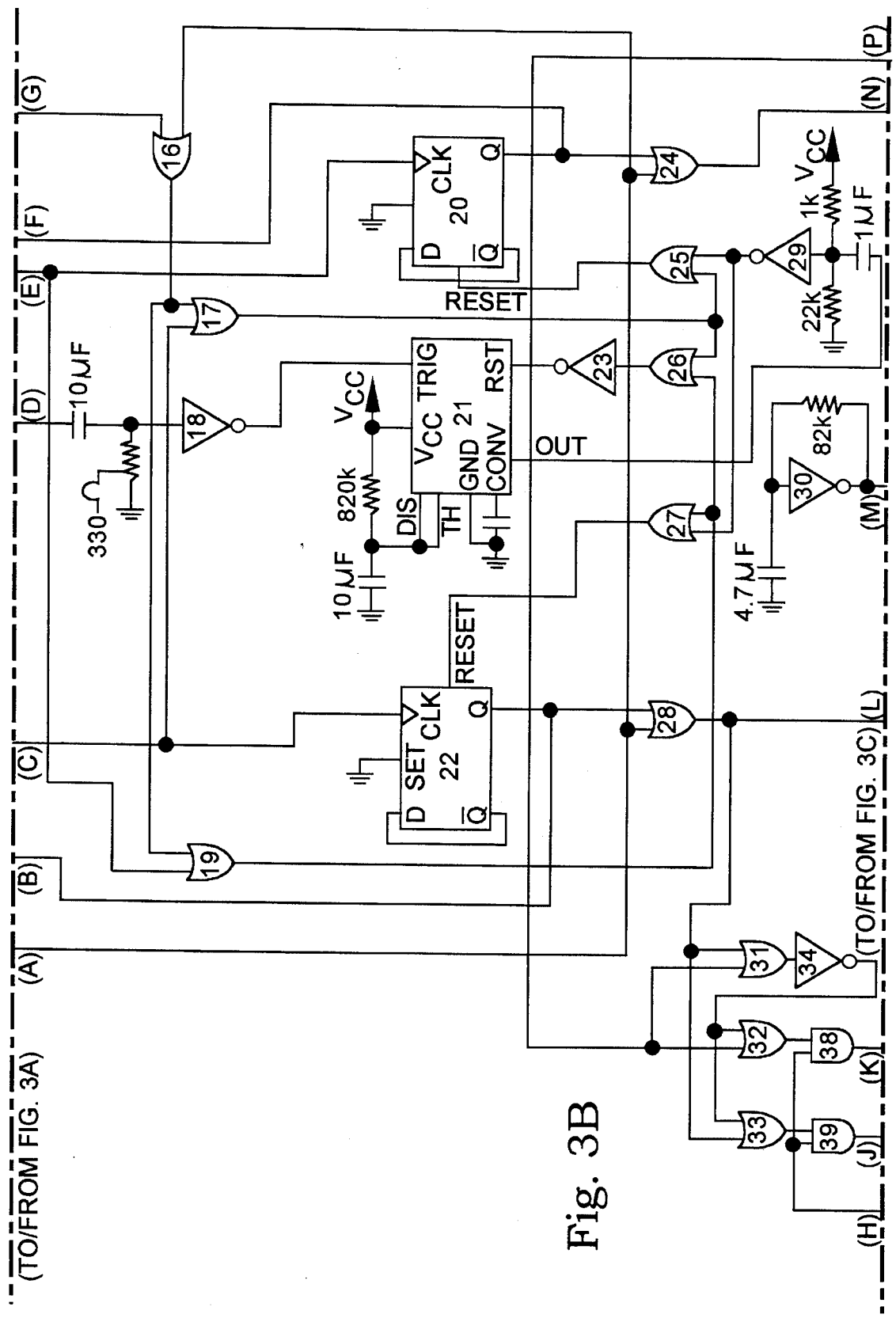
Figure 3C:
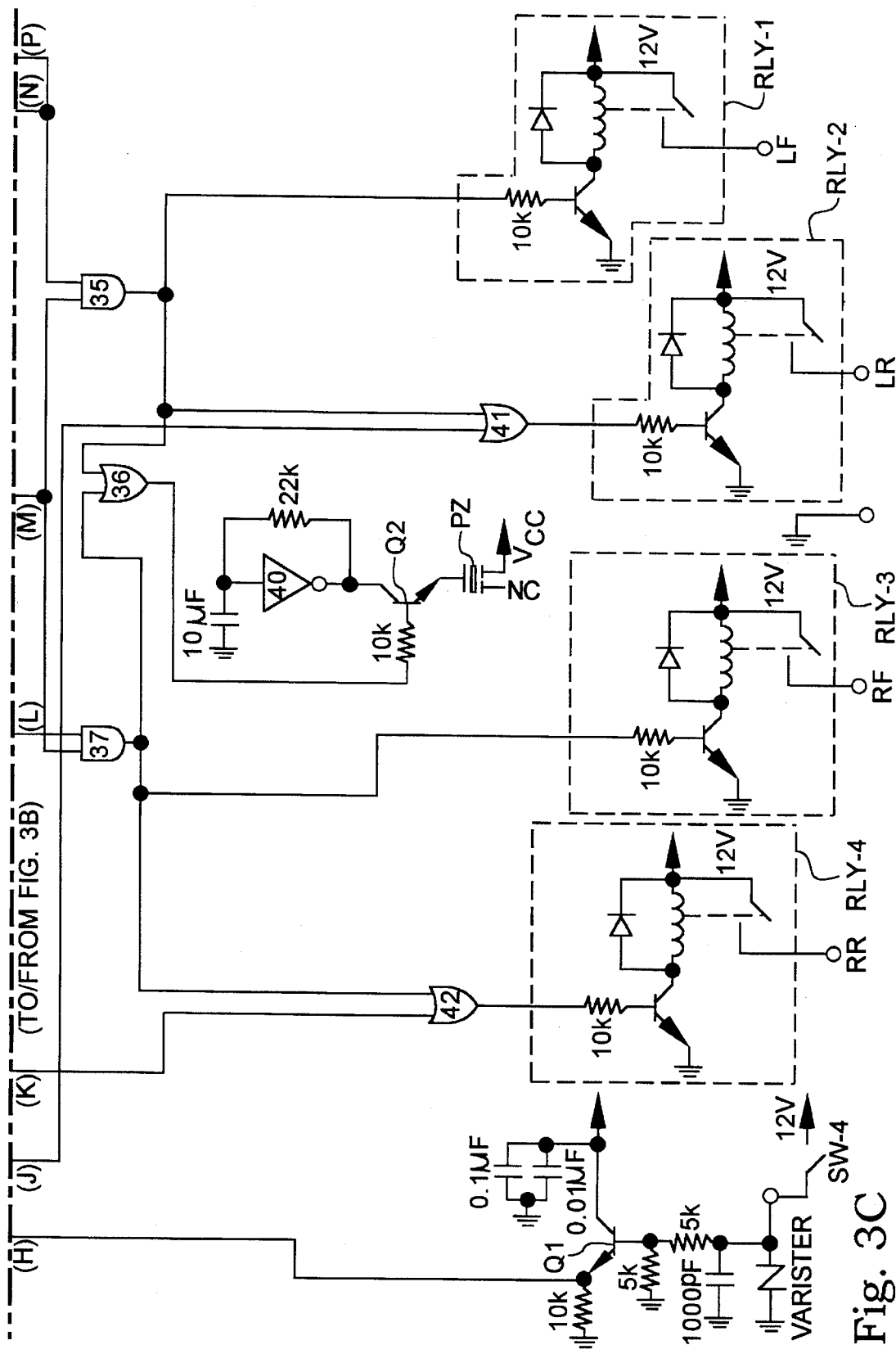

With reference to FIG. 3, which is composed of FIGS. 3A, 3B, and 3C, there is shown a schematic of the electronic self-canceling turn signal device of the present invention for operating the left front indicator light LF, left rear indicator light LR, right front indicator light RF, and right rear indicator light RR of a vehicle. As between FIGS. 3A, 3B and 3C, like circuit lines are identified with like reference letters in parentheses. Each indicator light is controlled by a different transistor-controlled relay circuit, designated RLY-1, RLY-2, RLY-3, and RLY-4, respectively, for switching the power to the respective lamp. The transistor-controlled relay circuits each have a NPN switching transistor in common-emitter mode controlling the coil of a normally-open relay. The relay circuit also has a standard current limiting resistor on the base of the transistor and coil-surge protection diode of appropriate operating characteristics.

The relay circuit RLY-1 is controlled by a digital AND gate 35.

The AND gate 35 is controlled by a first input from an OR gate 24 and by a second input from a standard Schmitt trigger 30 configured as a Schmitt trigger multivibrator with a feedback resistor and a grounding capacitor at the input of the Schmitt trigger 30.

The OR gate 24 is controlled by a first input from the Q output of a D type flip-flop switch 20 and by a second input from the Q output of another D type flip-flop switch 11.

The D type flip-flop switch 20 has its NOT Q output connected to its D input so that the flip-flop switch 20 will change states every CLOCK pulse. The CLOCK of the flip-flop switch 20 is controlled by an input from an AND gate 2. The RESET input of the flip-flop switch 20 is controlled by an input from an OR gate 25. The SET of the flip-flop switch 20 is not used and is, therefore, grounded.

The AND gate 2 is controlled by a first input from an inverter 1 and by a second input from an inverter 8.

The inverter 1 is controlled by supply voltage Vcc (with an appropriate current pull-up limiting resistor) in parallel with a momentary switch SW-1 leading to ground through a series resistor and in parallel with a capacitor also connected to ground used to debounce or stabilize the pulse from the switch SW-1.

The inverter 8 is controlled by an input from an inverter 6.

The inverter 6 is controlled by supply voltage Vcc (with an appropriate current limiting resistor) in parallel with a momentary switch SW-2 leading to ground through a series resistor and in parallel with a capacitor also connected to ground used to debounce or stabilize the pulse from the switch SW-2.

The OR gate 25 is controlled by a first input from an inverter 29 and by a second input from an OR gate 17.

The inverter 29 is controlled by an input from a timer device 21, such as a 555 timer for example. An RC network is included at the input of the inverter 29 which will stabilize the pulse from the timer 21 and cause the inverter 29 to respond to the negative edge of the pulse created by the timer 21.

The timer 21 is a 555 or equivalent circuit configured to be a monostable pulse generator with, for the 555 circuit shown, a RC network connected to the timer 21 for controlling the width and time period of the pulse generated. The TRIGGER of the timer 21 is controlled by an input from an inverter 18. The RESET of the timer 21 is controlled by an input from an inverter 23.

The inverter 23 is controlled by an input from an OR gate 26.

The OR gate 26 is controlled by a first input from the OR gate 17 and by a second input from an OR gate 19.

The OR gate 17 is controlled by a first input from an OR gate 16 and by a second input from an AND gate 7.

The OR gate 16 is controlled by a first input from an inverter 12 and by a second input from the D type flip-flop switch 11. The inverter 12 is configured as a monostable pulse generator with a resistor connected to supply voltage Vcc and a grounding capacitor connected to the input of the inverter 12.

The AND gate 7 is controlled by a first input from the inverter 6 and by a second input from an inverter 3.

The inverter 6 is controlled by supply voltage Vcc (with an appropriate current limiting resistor) in parallel with the momentary switch SW-2 leading to ground through a series resistor and in parallel with a capacitor also connected to ground used to debounce, or stabilize, the pulse from the switch SW-2.

The inverter 3 is controlled by an input from the inverter 1.

The inverter 1 is controlled by supply voltage Vcc (with an appropriate current resistor) in parallel with a momentary switch SW-1 leading to ground through a series resistor and in parallel with a capacitor also connected to ground used to debounce, or stabilize, the pulse from the switch SW-1.

The inverter 18 is controlled by an input from an OR gate 15. The inverter 18 is coupled to the OR gate 15 through a resistor and capacitor of an RC network producing a single positive pulse-edge trigger.

The OR gate 15 is controlled by a first input from an AND gate 13 and by a second input from another AND gate 14.

The AND gate 13 is controlled by a first input from the Q output of the D type flip-flop switch 20 and by a second input from the Q output of another D type flip-flop switch 10.

The AND gate 14 is controlled by a first input from the NOT Q output of the D type flip-flop switch 10 and by a second input from the Q output of another D type flip-flop switch 22.

The D type flip-flop switch 10 has its CLOCK controlled by an inverter 4. The D input of the D type flip-flop switch 10 is controlled by an inverter 5. The SET of the flip-flop switch 10 is controlled by the AND gate 7.

The inverter 4 is controlled by a first Hall Effect sensor HE-1 connected to ground and to the supply voltage Vcc through appropriate current limiting resistors so that a logic high signal is produced or the inverter 4 output when the first Hall Effect sensor HE-1 is activated by magnetic flux.

The inverter 5 is controlled by a second Hall Effect sensor HE-2 connected to ground and to the supply voltage Vcc through appropriate current limiting resistors so that a logic high signal is produced or the inverter 5 output when the second Hall Effect sensor HE-2 is activated by magnetic flux.

The D type flip-flop switch 11 has its NOT Q output connected to its D input so that the flip-flop switch 11 will change states with every CLOCK pulse. The CLOCK of the flip-flop switch 11 is controlled by an input from an inverter 9. The RESET of the flip-flop switch 11 is controlled by the inverter 12 which produces a reset signal during circuit power up. The SET of the flip-flop switch 11 is not used and is, therefore, grounded.

The inverter 9 is controlled by supply voltage Vcc (with an appropriate current limiting resistor) in parallel with a momentary switch SW-3 leading to ground through a series resistor and in parallel with a capacitor also connected to ground used to debounce, or stabilize, the pulse from the switch SW-3.

The AND gate 7 is controlled by a first input from the inverter 6 and by a second input from the inverter 3.

The inverter 6 is controlled by supply voltage Vcc (with an appropriate current limiting resistor) in parallel with the momentary switch SW-2 leading to ground through a series resistor and in parallel with a capacitor also connected to ground used to debounce, or stabilize, the pulse from the switch SW-2.

The inverter 3 is controlled by an input from the inverter 1.

The inverter 1 is controlled by supply voltage Vcc (with an appropriate current resistor) in parallel with a momentary switch SW-1 leading to ground through a series resistor and in parallel with a capacitor also connected to ground used to debounce, or stabilize, the pulse from the switch SW-1.

The AND gate 2 is controlled by a first input from the inverter 1 and by a second input from the inverter 8.

The inverter 1 is controlled by supply voltage Vcc (with an appropriate current limiting resistor) in parallel with a momentary switch SW-1 leading to ground through a series resistor and in parallel with a capacitor also connected to ground used to debounce or stabilize the pulse from the switch SW-1.

The inverter 8 is controlled by an input from the inverter 6.

The inverter 6 is controlled by supply voltage Vcc (with an appropriate current limiting resistor) in parallel with the momentary switch SW-2 leading to ground through a series resistor and in parallel with a capacitor also connected to ground used to debounce, or stabilize, the pulse from the switch SW-2.

The relay circuit RLY-2 is controlled by a digital OR gate 41.

The OR gate 41 is controlled by a first input from the AND gate 35 (the operation of which has been described above) and by a second input from an AND gate 39.

The AND gate 39 is controlled by a first input from an OR gate 33 and by a second input from a switching transistor Q1 in common-emitter configuration controlled by a momentary switch SW-4 connected to the supply voltage 12 V to a logic level signal Vcc.

The OR gate 33 is controlled by first input from an inverter 34 and by a second input from an OR gate 28.

The inverter 34 is controlled by an input from an OR gate 31.

The OR 31 gate is controlled by a first input from the OR gate 28 and by a second input from the OR gate 24.

The OR gate 24 is controlled by a first input from the Q output of the D type flip-flop switch 20 and by a second input from the Q output of the other D type flip-flop switch 11.

The D type flip-flop switch 20 has its NOT Q output connected to its D input so that the flip-flop switch 20 will change states every CLOCK pulse. The CLOCK of the flip-flop switch 20 is controlled by an input from the AND gate 2. The RESET input of the flip-flop switch 20 is controlled by an input from the OR gate 25. The SET of the flip-flop switch 20 is not used and is, therefore, grounded.

The AND gate 2 is controlled by a first input from the inverter 1 and by a second input from the inverter 8.

The inverter 1 is controlled by the supply voltage Vcc (with an appropriate current limiting resistor) in parallel with the momentary switch SW-1 leading to ground through a series resistor and in parallel with a capacitor also connected to ground used to debounce or stabilize the pulse from the switch.

The OR gate 25 is controlled by a first input from the inverter 29 and by a second input from the OR gate 17.

The inverter 29 is controlled by an input from the timer device 21 such as a 555 timer. An RC network is included at the input of the inverter 29 which will stabilize the pulse from the timer 21 and cause the inverter 29 to respond to the negative edge of the pulse created by the timer 21.

The timer 21 is a 555 or equivalent circuit configured to be a monostable pulse generator with, for the 555 circuit shown, an RC network connected to the timer 21 for controlling the time period of the pulse generated. The TRIGGER of the timer 21 is controlled by an input from the inverter 18. The RESET of the timer 21 is controlled by an input from the inverter 23.

The inverter 23 is controlled by an input from the OR gate 26.

The OR gate 26 is controlled by a first input from the OR gate 17 and by a second input from the OR gate 19.

The OR gate 17 is controlled by a first input from the OR gate 16 and by a second input from the AND gate 7.

The OR gate 16 is controlled by a first input from an inverter 12 and by a second input from the D type flip-flop switch 11. The inverter 12 is configured as a monostable pulse generator with a resistor connected to supply voltage Vcc and a grounding capacitor connected to the input of the inverter 12.

The AND gate 7 is controlled by a first input from the inverter 6 and by a second input from an inverter 3.

The inverter 6 is controlled by supply voltage Vcc (with an appropriate current limiting resistor) in parallel with the momentary switch SW-2 leading to ground through a series resistor and in parallel with a capacitor also connected to ground used to debounce, or stabilize, the pulse from the switch SW-2.

The inverter 3 is controlled by an input from the inverter 1.

The inverter 1 is controlled by supply voltage Vcc (with an appropriate current resistor) in parallel with a momentary switch SW-1 leading to ground through a series resistor and in parallel with a capacitor also connected to ground used to debounce, or stabilize, the pulse from the switch SW-1.

The OR gate 19 is controlled by a first input from the OR gate 16 and by a second input from the AND gate 2.

The OR gate 16 is controlled by a first input from an inverter 12 and by a second input from the D type flip-flop switch 11. The inverter 12 is configured as a monostable pulse generator with a resistor connected to supply voltage Vcc and a grounding capacitor connected to the input of the inverter 12.

The AND gate 2 is controlled by a first input from the inverter 1 and by a second input from an inverter 8.

The inverter 1 is controlled by supply voltage Vcc (with an appropriate current limiting resistor) in parallel with the momentary switch SW-1 leading to ground through a series resistor and in parallel with a capacitor also connected to ground used to debounce, or stabilize, the pulse from the switch SW-1.

The inverter 8 is controlled by an input from the inverter 6.

The inverter 6 is controlled by supply voltage Vcc (with an appropriate current resistor) in parallel with a momentary switch SW-2 leading to ground through a series resistor and in parallel with a capacitor also connected to ground used to debounce, or stabilize, the pulse from the switch SW-2.

The inverter 18 is controlled by an input from the OR gate 15. An RC network is included at the input of the inverter 18 which will stabilize the pulse from the OR gate 15 and cause the inverter 18 to respond to the positive edge of the pulse created by the OR gate 15.

The OR gate 15 is controlled by a first input from the AND gate 13 and by a second input from the other AND gate 14.

The AND gate 13 is controlled by a first input from the Q output of the D type flip-flop switch 20 and by a second input from the Q output of the D type flip-flop switch 10.

The AND gate 14 is controlled by a first input from the NOT Q output of a D type flip-flop switch 10 and by a second input from the Q output of the D type flip-flop switch 22.

The D type flip-flop switch 10 has its CLOCK controlled by the inverter 4. The D input of the D type flip-flop switch 10 is controlled by the inverter 5. The SET of the flip-flop switch 10 is controlled by the AND gate 2 and the RESET of the flip-flop switch 10 is controlled by the AND gate 7.

The inverter 4 is controlled by the first Hall Effect sensor HE-1 connected to ground and to the supply voltage Vcc through appropriate current limiting resistors so that a logic low signal is produced when the first Hall Effect sensor HE-1 is activated by magnetic flux.

The inverter 5 is controlled by the second Hall Effect sensor HE-2 connected to ground and to the supply voltage Vcc through appropriate current limiting resistors so that a logic low signal is produced when the second Hall Effect sensor HE-2 is activated by magnetic flux.

The AND gate 2 is controlled by a first input from the inverter 1 and by a second input from the inverter 8.

The inverter 1 is controlled by supply voltage Vcc (with an appropriate current limiting resistor) in parallel with a momentary switch SW-1 leading to ground through a series resistor and in parallel with a capacitor also connected to ground used to debounce or stabilize the pulse from the switch SW-1.

The inverter 8 is controlled by an input from the inverter 6.

The inverter 6 is controlled by supply voltage Vcc with an appropriate current limiting resistor) in parallel with a momentary switch SW-2 leading to ground through a series resistor and in parallel with a capacitor also connected to ground used to debounce or stabilize the pulse from the switch SW-2.

The AND gate 7 is controlled by a first input from the inverter 6 and by a second input from the inverter 3.

The inverter 6 is controlled by supply voltage Vcc (with an appropriate current limiting resistor) in parallel with the momentary switch SW-2 leading to ground through a series resistor and in parallel with a capacitor also connected to ground used to debounce, or stabilize, the pulse from the switch SW-2.

The inverter 3 is controlled by an input from the inverter 1.

The inverter 1 is controlled by supply voltage Vcc (with an appropriate current limiting resistor) in parallel with the momentary switch SW-1 leading to ground through a series resistor and in parallel with a capacitor also connected to ground used to debounce, or stabilize, the pulse from the switch SW-1.

The D type flip-flop switch 11 has its NOT Q output connected to its D input so that the flip-flop switch 11 will change states with every CLOCK pulse. The CLOCK of the flip-flop switch 11 is controlled by an input from the inverter 9. The RESET of the flip-flop switch 11 is controlled by the inverter 12 which produces a reset signal during circuit power-up. The SET of the flip-flop switch 11 is not used and is, therefore, grounded.

The inverter 9 is controlled by supply voltage Vcc (with an appropriate current limiting resistor) in parallel with the momentary switch SW-3 leading to ground through a series resistor and in parallel with a capacitor also connected to ground used to debounce, or stabilize, the pulse from the switch SW-3.

The relay circuit RLY-3 is controlled by a digital AND gate 37.

The AND gate 37 is controlled by a first input from the OR gate 28 and by a second input from the Schmitt trigger 30.

The OR gate 28 is controlled by a first input from the Q output of the D type flip-flop switch 22 and by a second input from the Q output of the other D type flip-flop switch 11.

The D type flip-flop switch 22 has its NOT Q output connected to its D input so that the flip-flop switch 22 will change states every CLOCK pulse. The CLOCK of the flip-flop switch 22 is controlled by an input from the AND gate 7. The RESET input of the flip-flop switch 22 is controlled by an input from an OR gate 27. The SET of the flip-flop switch 22 is not used and is, therefore, grounded.

The inverter 6 is controlled by the supply voltage Vcc (with an appropriate current limiting resistor) in parallel with the momentary switch SW-2 leading to ground through a series resistor and in parallel with a capacitor also connected to ground used to debounce or stabilize the pulse from the switch SW-2.

The OR gate 27 is controlled by a first input from the inverter 29 and by a second input from the OR gate 17.

The inverter 29 is controlled by an input from the timer device 21. An RC network is included at the input of the inverter 29 which will stabilize the pulse from the timer 21 and cause the inverter 29 to respond to the negative edge of the pulse created by the timer 21.

The TRIGGER of the timer 21 is controlled by an input from the inverter 18. The RESET of the timer 21 is controlled by an input from the inverter 23.

The inverter 23 is controlled by an input from the OR gate 26.

The OR gate 26 is controlled by a first input from the OR gate 17 and by a second input from the OR gate 19.

The OR gate 17 is controlled by a first input from the OR gate 16 and by a second input from the AND gate 7.

The OR gate 16 is controlled by a first input from an inverter 12 and by a second input from the D type flip-flop switch 11. The inverter 12 is configured as a monostable pulse generator with a resistor connected to supply voltage Vcc and a grounding capacitor connected to the input of the inverter 12.

The AND gate 7 is controlled by a first input from the inverter 6 and by a second input from the inverter 3.

The inverter 6 is controlled by supply voltage Vcc (with an appropriate current limiting resistor) in parallel with the momentary switch SW-2 leading to ground through a series resistor and in parallel with a capacitor also connected to ground used to debounce, or stabilize, the pulse from the switch SW-2.

The inverter 3 is controlled by an input from the inverter 1.

The inverter 1 is controlled by supply voltage Vcc (with an appropriate current limiting resistor) in parallel with the momentary switch SW-1 leading to ground through a series resistor and in parallel with a capacitor also connected to ground used to debounce, or stabilize, the pulse from the switch SW-1.

The inverter 18 is controlled by an input from the OR gate 15. An RC network is included at the input of the inverter 29 which will stabilize the pulse from the OR gate 15 and cause the inverter 18 to respond to the positive edge of the pulse from the OR gate 15.

The OR gate 15 is controlled by a first input from the AND gate 13 and by a second input from the other AND gate 14.

The AND gate 13 is controlled by a first input from the Q output of the D type flip-flop switch 10 and by a second input from the Q output of the D type flip-flop switch 20.

The AND gate 14 is controlled by a first input from the NOT Q output of the D type flip-flop switch 10 and by a second input from the Q output of the D type flip-flop switch 22.

The D type flip-flop switch 10 has its CLOCK controlled by the inverter 4. The D input of the D type flip-flop switch 10 is controlled by the inverter 5. The SET of the flip-flop switch 10 is controlled by the inverter 1 and the RESET of the flip-flop switch 10 is controlled by the AND gate 7.

The inverter 4 is controlled by the first Hall Effect sensor HE-1 connected to ground and to the supply voltage Vcc through appropriate current limiting resistors so that a logic low signal is produced when the first Hall Effect sensor HE-1 is activated by magnetic flux.

The inverter 5 is controlled by the second Hall Effect sensor HE-2 connected to ground and to the supply voltage Vcc through appropriate current limiting resistors so that a logic high signal is produced when the second Hall Effect sensor HE-2 is activated by magnetic flux.

The D type flip-flop switch 11 has its NOT Q output connected to its D input so that the flip-flop switch 11 will change states with every CLOCK pulse. The CLOCK of the flip-flop switch 11 is controlled by an input from the inverter 9. The RESET of the flip-flop switch 11 is controlled by the inverter 12 which produces a reset signal during circuit power-up. The SET of the flip-flop switch 11 is not used and is, therefore, grounded.

The inverter 9 is controlled by supply voltage Vcc (with an appropriate current limiting resistor) in parallel with the momentary switch SW-3 leading to ground through a series resistor and in parallel with a capacitor also connected to ground used to debounce or stabilize the pulse from the switch SW-3.

The relay circuit RLY-4 is controlled by a digital OR gate 42.

The OR gate 42 is controlled by a first input from the AND gate 37 (the functioning of which has been described above) and by a second input from an AND gate 38.

The AND gate 38 is controlled by a first input from an OR gate 32 and by a second input from the switching transistor Q1 in common-emitter configuration controlled by the momentary switch SW-4 connected to the supply voltage 12V and an RC network for conditioning the supply voltage 12V to a logic level signal Vcc.

The OR gate 32 is controlled by first input from the inverter 34 and by a second input from the OR gate 28.

The inverter 34 is controlled by an input from the OR gate 31.

The OR gate 31 is controlled by a first input from the OR gate 28 and by a second input from the OR gate 24.

The OR gate 28 is controlled by a first input from the Q output of the D type flip-flop switch 22 and by a second input from the Q output of the other D type flip-flop switch 11.

The D type flip-flop switch 22 has its NOT Q output connected to its D input so that the flip-flop switch 22 will change states every clock pulse. The CLOCK of the flip-flop switch 22 is controlled by an input from the inverter 4. The RESET input of the flip-flop switch 22 is controlled by an input from the OR gate 27. The SET of the flip-flop switch 22 is not used and, therefore, grounded.

The inverter 6 is controlled by the supply voltage Vcc (with an appropriate current limiting resistor) in parallel with the momentary switch SW-2 leading to ground through a series resistor and in parallel with a capacitor also connected to ground used to debounce or stabilize the pulse from the switch.

The OR gate 27 is controlled by a first input from the inverter 29 and by a second input from the OR gate 19.

The inverter 29 is controlled by an input from the timer device 21. An RC network is included at the input of the inverter 29 which will stabilize the pulse from the timer 21 and cause the inverter 29 to respond to the negative edge of the pulse created by the timer 21.

The TRIGGER of the timer 21 is controlled by an input from the inverter 18. The RESET of the timer 21 is controlled by an input from the inverter 23.

The inverter 23 is controlled by an input from the OR gate 26.

The OR gate 26 is controlled by a first input from the OR gate 17 and by a second input from the OR gate 19.

The OR gate 17 is controlled by a first input from the OR gate 16 and by a second input from the AND gate 7.

The OR gate 16 is controlled by a first input from an inverter 12 and by a second input from the D type flip-flop switch 11. The inverter 12 is configured as a monostable pulse generator with a resistor connected to supply voltage Vcc and a grounding capacitor connected to the input of the inverter 12.

The AND gate 7 is controlled by a first input from the inverter 6 and by a second input from the inverter 3.

The inverter 6 is controlled by supply voltage Vcc (with an appropriate current limiting resistor) in parallel with the momentary switch SW-2 leading to ground through a series resistor and in parallel with a capacitor also connected to ground used to debounce, or stabilize, the pulse from the switch SW-2.

The inverter 3 is controlled by an input from the inverter 1.

The inverter 1 is controlled by supply voltage Vcc (with an appropriate current limiting resistor) in parallel with the momentary switch SW-1 leading to ground through a series resistor and in parallel with a capacitor also connected to ground used to debounce, or stabilize, the pulse from the switch SW-1.

The inverter 18 is controlled by an input from the OR gate 15. An RC network is included at the input of the inverter 29 which will stabilize the pulse from the OR gate 15 and cause the inverter 18 to respond to the positive edge of the pulse from the OR gate 15.

The OR gate 15 is controlled by a first input from the AND gate 13 and by a second input from the other AND gate 14.

The AND gate 13 is controlled by a first input from the Q output of the D type flip-flop switch 10 and by a second input from the Q output of the D type flip-flop switch 20.

The AND gate 14 is controlled by a first input from the NOT Q output of the D type flip-flop switch 10 and by a second input from the Q output of the D type flip-flop switch 22.

The D type flip-flop switch 10 has its CLOCK controlled by the inverter 4. The D input of the D type flip-flop switch 10 is controlled by the inverter 5. The SET of the flip-flop switch 10 is controlled by the AND gate 2 and the RESET of the flip-flop switch 10 is controlled by the AND gate 7.

The inverter 4 is controlled by the first Hall Effect sensor HE-1 connected to ground and to the supply voltage Vcc through appropriate current limiting resistors so that a logic high signal is produced when the first Hall Effect sensor HE-1 is activated by magnetic flux.

The inverter 5 is controlled by the second Hall Effect sensor HE-2 connected to ground and to the supply voltage Vcc through appropriate current limiting resistors so that a logic high signal is produced when the second Hall Effect sensor HE-2 is activated by magnetic flux.

The D type flip-flop switch 11 has its NOT Q output connected to its D input so that the flip-flop switch 11 will change states with every CLOCK pulse. The CLOCK of the flip-flop switch 11 is controlled by an input from the inverter 9. The RESET of the flip-flop switch 11 is controlled by the inverter 12 which produces a reset signal during circuit power-up. The SET of the flip-flop switch 22 is not used and is, therefore, grounded. The inverter 9 is controlled by supply voltage Vcc (with an appropriate current limiting resistor) in parallel with the momentary switch SW-3 leading to ground through a series resistor and in parallel with a capacitor also connected to ground used to debounce or stabilize the pulse from the switch SW-3.

There is also shown an audible indicator circuit for alerting the operator of the vehicle that a turn indicator function or the hazard indicator function is activated. The audible indicator circuit consists of a peizo buzzer element PZ electrically connected to the emitter and controlled by an NPN switching transistor Q2.

The switching transistor Q2 is controlled at its base by an OR gate 36 and the switching transistor Q2 has a standard Schmitt trigger 40 configured as a Schmitt trigger multivibrator with a feedback resistor and a grounding capacitor at the input of the Schmitt trigger 40 supplying current to the collector of the switching transistor Q2.

The OR gate 36 is controlled by a first input from the AND gate 35 and by a second input from the AND gate 37.

The following description correlates the block diagrams of FIGS. 1 and 2 to the schematic of FIG. 3. The left blinker means "A" consists of Schmitt trigger 30 and associated RC network, AND gate 35, and the OR gate 24. The right blinker means "B" consists of Schmitt trigger 30 and associated RC network, AND gate 37 and the OR gate 28. The left switch means "C" consists of the D type flip-flop switch 20. The right switch means "D" consists of the D type flip-flop switch 22. The left turn indicator demand means "E" consists of momentary switch SW-1 and the associated RC network for debouncing the inverter 1. The right turn indicator demand means "F" consists of momentary switch SW-2 and associated RC network for debouncing. The left turn indicator canceling means "GL" consists of the first Hall Effect sensor HE-1, the second Hall Effect sensor HE-2, inverter 4, inverter 5, D type flip-flop switch 10 using the Q output, AND gate 13, and OR gate 15. The right turn indicator canceling means "GR" consists of the first Hall Effect sensor HE-1, the second Hall Effect sensor HE-2, inverter 4, inverter 5, D type flip-flop switch 10 using the Q output, AND gate 14, and OR gate 15. The timer means "H" consists of timer 21 with associated RC network, and inverter 18 and associated positive edge pulse trigger RC network for signal conditioning. The audible indicator means "I" consists of the Schmitt trigger 40 and associated RC network, second switching transistor Q2, Peizo buzzer element PZ, and OR gate 36. The momentary brake switch means "J" consists of momentary switch SW-4, and associated RC network for debouncing, and the first switching transistor Q1. The braking indicator logic means "K" consists of the OR gate 31, the OR gate 32, the OR gate 33, the inverter 34, the AND gate 38, and the AND gate 39. The hazard indicator means "L" consists of momentary switch SW-3 and associated RC network for debouncing, and the D type flip-flop switch 11.

In a typical installation of the electronic self-canceling turn signal device of the present invention shown in the schematic of FIGS. 3A, 3B and 3C, at least one magnet is mounted on the steering wheel of the vehicle near its hub for rotation with the steering wheel.

The first Hall Effect sensor HE-1 is mounted near the magnet on, for example the steering column, so that rotation of the steering wheel will activate the first Hall Effect sensor HE-1. The second Hall Effect sensor HE-2 is also mounted near the magnet on the steering column spaced from the first Hall Effect sensor HE-1.

The momentary switches SW-1 and SW-2 of the left and right indicator demand means "E" and "F", respectively, are mounted to a lever type switch linkage, similar to the steering column mounted switch linkages currently in common use, such that displacement of the lever in one direction will close the first momentary switch SW-1, and displacement of the lever in the opposite direction will close the second momentary switch SW-2.

The momentary brake switch SW-4 of the momentary brake switch means "J" is connected to the brake actuator mechanism of the vehicle in such a manner so that when the vehicle brakes are applied, the switch SW-4 is closed.

The momentary hazard switch SW-3 of the hazard indicator means "L" is mounted in any convenient location for operation by the operator of the vehicle.

The switching logic circuitry of the present invention is manufactured on a printed circuit board and housed in a suitable case and may be mounted in any convenient location.

With continued reference to the schematic of FIG. 3A, 3B and 3C, some typical operations of the device of the present invention and behaviors of various components will hereafter be discussed to provide a better understanding of the device of the present invention and no limitations are implied or should be understood.

As the electronic self-canceling turn signal device is initially powered-up by application of the supply voltage Vcc to the device, the inverter 12 and its associated RC network create a logic high pulse lasting a predetermined time, for this example approximately 2 seconds, for the purpose of forcing D type flip-flop switches 20 and 22 to an initial state of logic low at their respective Q outputs. The logic high pulse from the inverter 12 also resets the timer 21, preparing the timer 21 for a full timing cycle.

When the momentary switch SW-1 of the left turn indicator demand means "E" is closed, for the purpose of indicating a left turn, the inverter 1 produces a logic high state which, in turn, produces a logic high through the AND gate 2. The logic high signal from the AND gate 2 goes to the OR gate 19 producing a logic high at the output of the OR gate 19. The logic high of the OR gate 19 passes through the OR gate 27 and appears at the RESET of the D type flip-flop switch 22. The logic high signal at the output of the OR gate 19 also passes through the OR gate 26 producing a logic high signal at the input of the inverter 23. The inverter 23 converts the logic high signal at its input to a logic low signal which is sent to the RESET of the timer 21. The logic high signal of the AND gate 2 also goes to the CLOCK of the D type flip-flop switch which causes the D type flip-flop switch 20 to shift its Q output from logic low to logic high. The logic high Q output of the flip-flop switch 20 is then sent to the OR gate 24 which, responding to the logic high input sends a logic high to the AND gate 35. Upon receiving the logic high at its first input and the continually pulsing signal of the Schmitt trigger 30, the AND gate 35 alternately sends logic high and logic low signals to the first switching transistor controlled relay circuit RLY-1 and to the OR gate 41 which, in turn, sends the logic high signal from the AND gate 35 to the switching transistor controlled relay circuit RLY-2 in synchronization with the Schmitt trigger 30. As the first switching transistor controlled relay circuit RLY-1 and the second switching transistor controlled relay circuit RLY-2 are energized and de-energized by the AND gate 35, the left front indicator light LF and the left rear indicator light LR are illuminated in a blinking manner. The AND gate 35 also sends its logic high signal to the OR gate 36 which, in turn, sends a logic high signal to the audible indicator means "I" comprised of the peizo buzzer PZ and the Schmitt trigger 40. The audible indicator means "I" will then trigger the Peizo buzzer which will indicate to the vehicle operator that a turn indicator function is activated. The logic high signal of the AND gate 2 also goes to the SET of the D type flip-flop switch 10 which forces the Q output of the D type flip-flop switch 10 to a logic high state. The logic high signal from the Q output of the D type flip-flop switch 10 goes to the AND gate 13. Since the AND gate 13 has a logic high at its first input (from the Q output of the D type flip-flop switch 20) and a logic high at its second input from the Q output of the D type flip-flop switch 10), the AND gate 13 produces a logic high output. The logic high output of the AND gate 13 passes through the OR gate 15 and then passes through the positive edge triggered inverter 18. The inverter 18 responds to the positive edge created by the transistor of the input of the inverter 18 from logic low to logic high by sending a triggering pulse to the TRIGGER of the timer 21. However, since the RESET of the timer 21 is at logic low, the timer 21 ignores the triggering pulse appearing at its TRIGGER and is not activated.

When the momentary switch SW-1 of the left turn indicator demand means "E" is opened, by the vehicle operator releasing the momentary switch SW-1, the inverter 1 produces a logic low state which, in turn, produces a logic low state through the AND gate 2. The logic low signal from the AND gate 2 goes to the OR gate 19 producing a logic low at the output of the OR gate 19. The logic low of the OR gate 19 passes to the OR gate 26 which produces a logic low at the output of the OR gate 26. The logic low output of the OR gate 26 passes to the input of the inverter 23. The logic low at the input of the inverter 23 is converted to a logic high signal which is sent to the RESET of the timer 21. Since the RESET of the timer 21 is at logic high, the timer is ready to execute a full timing cycle. The logic low signal of the AND gate 2 also goes to the SET of the D type flip-flop switch 10, to the CLOCK of the D type flip-flop switch 20, but, due to the conventional structure of the D type flip-flop switch 20, these have no effect.

When the vehicle brakes are applied while the device is activated to indicate a left turn, as discussed above, the momentary switch SW-4 of the brake switch means "J" is closed in response to the brakes of the vehicle being applied, and current from the voltage source Vcc is allowed to flow through the switching transistor Q1 to the AND gate 38 which controls the right side brake indicator function, and the AND gate 39 which controls the left side brake indicator function. The OR gate 31 and the inverter 34 define a switching logic that delivers a logic high output to the OR gate 32 and the OR gate 33 only if the turn indicator functions are deactivated and the hazard indicator function is deactivated. In the present example, since the left turn indicator function is activated, the output from the inverter 34 is logic low. The OR gate 32 will deliver a logic high output to the first input of the AND gate 38 due to the logic high input from the OR gate 24. The switching transistor Q1 will also deliver a logic high output to the second input of the AND gate 38. Since both inputs of the AND gate 38 are logic high, the output of the AND gate 38 is logic high, the logic high signal of the AND gate 38 will pass through the OR gate 42 and will activate the switching transistor controlled relay circuit RLY-4 directly and without regard for the status of the Schmitt trigger 30. The result of the constant logic high signal provided by the AND gate 38 is that the right rear indicator light RR will be illuminated in a constant manner. Since, in this example, the OR gate 33 has both inputs receiving logic low signals, the AND gate 39 will receive a logic low input from the OR gate 33 and will, in turn, produce a logic low output. Since the output of the AND gate 39 is logic low, the brake indicator function is not activated on the left rear indicator light LR, and it continued to be illuminated in a blinking manner.

As the momentary switch SW-4 is opened in response to the brakes of the vehicle no longer being applied or being released, both the AND gate 38 and the AND gate 39 receive a logic low signal from the switching transistor Q1 and the brake indicator function, therefore, is deactivated regardless of other conditions.

When the vehicle operator initially turns the steering wheel of the vehicle in a clockwise or right-turn direction, during a wide sweeping left-turn maneuver, the second Hall Effect sensor HE-2 is activated and the first Hall Effect sensor HE-1 is activated a short time later. The activated first Hall Effect sensor HE-1 (coupled through the inverter 4) sends a logic high pulse to the CLOCK pulse to the D type flip-flop switch 10. The D type flip-flop switch 10 sees a logic high signal at its D input because the second Hall Effect sensor HE-2 is activated and the D type flip-flop switch 10, therefore, keeps its Q output at a logic high state. As has been shown above, the initial right-turn motion of the steering wheel of the vehicles does not effect the switching status of the device.

When the vehicle operator turns the steering wheel of the vehicle in a counter-clockwise or left turn direction, to execute the actual turn, the first Hall Effect sensor HE-1 is activated. The activated first Hall Effect sensor HE-1 (coupled through inverter 4) sends a logic high pulse to the CLOCK of the D type flip-flop switch 10. Since the second Hall Effect sensor HE-2 has not yet been activated by the left turn motion of the steering mechanism, the D input of the D type flip-flop switch 10 is at logic low. Due to the logic low at the D input of the D type flip-flop switch 10, the D type flip-flop switch 10 changes the state of its Q output to logic low (and its NOT Q output to logic high). The logic low from the Q output of the D type flip-flop switch 10 goes to the AND gate 13 which, because of the logic low from the D type flip-flop switch 10, changes its output to the OR gate 15 from logic high to logic low. Although the AND gate 14 receives a logic high signal from the NOT Q output of the D type flip-flop switch 10, the AND gate 14 also receives a logic low signal from the Q output of the D type flip-flop switch 22 and, therefore, sends a logic low output to the OR gate 15. The OR gate 15, upon receiving a logic low input signal from the AND gate 13 and a logic low signal from the AND gate 14, changes the state of its output from logic high to logic low. The positive edge triggered inverter 18 receives the logic signal from the OR gate 15 and is not triggered because the logic high to logic low transition of the output signal from the OR gate 15 creates a negative edge, not a positive edge. Since the inverter 18 is not triggered, no other changes in the switching status of the device take place. As has just been demonstrated, when the vehicle operator turns the steering wheel in a counter-clockwise or left-turn direction, the left-turn indicator function remains active and the left front LF and left rear LR indicator lights continue to blink.

When the vehicle operator turns the steering wheel of the vehicle in a clockwise or right-turn direction, to straighten the vehicle, the second Hall Effect sensor HE-2 is activated and the first Hall Effect sensor HE-1 is activated a short time later. The activated first Hall Effect sensor HE-1 (coupled through the inverter 4) sends a logic high pulse to the CLOCK pulse to the D type flip-flop switch 10. The D type flip-flop switch 10 sees a logic high signal at its D input because the second Hall Effect sensor HE-2 is activated and the D type flip-flop switch 10, therefore, changes the state of its Q output from a logic low to a logic high state. The AND gate 13 receives the logic high from the Q output of the D type flip-flop switch 10 (and the logic high signal from the Q output of the D type flip-flop switch 20) and, therefore, changes the state of its output from logic low to logic high. The logic high output of the AND gate 13 passes through the OR gate 15 and then passes to the positive edge triggered inverter 18 and triggers the timer 21. The timer 21 completes a single monostable cycle of a time duration predetermined by the RC network associated with the timer 21. The output from the timer 21 passes through the inverter 29 and also passes through OR gates 25 and 27 and activates the RESET inputs of the D type flip-flop switches 20 and 22. The action of activating the RESET inputs of D type flip-flop switches 20 and 22 set their respective Q outputs to logic low and, therefore, deactivate or cancel any activated turn indicator function.

As the vehicle operator turns the steering wheel of the vehicle in a clockwise or right-hand turn direction, during a wide sweeping left-turn maneuver, the first Hall Effect sensor HE-1 is activated sending a CLOCK pulse to the D type flip-flop switch 10. The D type flip-flop switch 10 sees a logic low signal at its D input, because the second Hall Effect sensor HE-2 is not activated at this time, and, therefore, sets its Q output to a logic low. Since the AND gate 13 has one logic low input (the Q output from the D type flip-flop switch 10) and the AND gate 14 has one logic low input (the Q output from the D type flip-flop switch 22), a logic low output is produced by both the AND gate 13 and the AND gate 14 so the timing cycle of the timer 21 is not triggered through OR gate 15 and positive edge triggered inverter 18. As the steering wheel is further rotated in the clockwise direction, the second Hall Effect sensor HE-2 may be activated, but this will have no effect because the D type flip-flop switch will ignore the input of the second Hall Effect sensor HE-2 due to the fact that the CLOCK pulse from the first Hall Effect sensor HE-1 is no longer present (the CLOCK pulse is, for practical purposes, an instantaneous event). As has just been demonstrated, the movement of the steering wheel in a direction opposite the indicated turn direction, for example as discussed above, in a right-turn direction when the device has been activated to indicate a left turn, will have no effect on the switching status of the device. That is, the left-turn indicator lights and LR will continue to blink.

As the vehicle operator turns the steering wheel of the vehicle in a counter-clockwise or left-hand turn direction, in order to complete the actual left-turn maneuver, the second Hall Effect sensor HE-2 is activated and the first Hall Effect sensor HE-1 is activated a short time later. The activated first Hall Effect sensor HE-1 sends a CLOCK pulse to the D type flip-flop switch 10. The D type flip-flop switch 10 sees a logic high signal at its D input, because the Second Hall Effect sensor HE-1 is activated, and, therefore, sets its Q output to logic high.

While the above events are discussed in relationship to left-turn indicator function, the operation of the device in relationship to a right-turn indicator function are essentially identical and obvious to one skilled in the art with reference to the schematic of FIGS. 3A, 3B and 3C. Therefore, for the sake of brevity, the operation of the device during a right-turn maneuver will not be discussed.

As the hazard momentary switch SW-3 is momentarily closed, for the purpose of activating the indicator lights LF, LR, RF, RR all in a blinking or hazard alert manner, the inverter 9 produces a logic high state. The logic high signal from the inverter 9 goes to the CLOCK input of the D type flip-flop switch 11 forcing it to toggle from logic low at its Q output to logic high at its Q output. The logic high from the Q output of the D type flip-flop switch 11 couples to the respective RESET inputs of the D type flip-flop switches 20 and 22 through OR gages 16, 17, 19, 25, and 27 such that the logic high signal from the Q output of the D type flip-flop switch 11 resets both the D type flip-flop switches 20 and 22 forcing both of their respective Q outputs to logic low. This resetting action of the D type flip-flop switches 20 and 22 by the D type flip-flop switch 11 deactivates or cancels any turn indicator functions that were currently activated (in this example, however, no turn indicator function is currently active). The logic high signal of the D type flip-flop switch 11 also passes through OR gate 24 and OR gate 28 and triggers the four relay circuits RLY-1, RLY-2, RLY-3, and RLY-4 in a blinking manner. (NOTE; The signal paths from OR gate 24 and from OR gate 28 to the relay circuits RLY-1, RLY-2, RLY-3, RLY-4 are identical to the signal paths used for a turn indicator function.)). The audible indicator circuit is also activated in a manner identical to that used by the turn indicator functions.

As the switch SW-3 is again momentarily closed, for the purpose of deactivating the hazard indicators, the inverter 9 produces a logic high state. The logic high signal from the inverter 9 goes to the CLOCK input of the D type flip-flop switch 11 forcing it to toggle from logic high at its Q output to logic low at its Q output. The toggling of the Q output of the D type flip-flop switch 11 to logic low deactivates the hazard indicator function.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. An electronic self-canceling turn signal device for a motor vehicle having left front, left rear, right front, and right rear indicator lights comprising:
   left blinker means operatively associated with the left front and left rear indicator lights for selectively illuminating the left front and left rear indicator lights in a blinking manner;
   left switch means operatively associated with the left blinker means for controlling the activation and deactivation of the left blinker means;
   left turn indicator demand means operatively associated with the left switch means for selectively controlling the activation and deactivation of the left switch means;
   turn indicator canceling means operatively associated with the steering mechanism of the vehicle to sense position of the vehicle steering mechanism;
   right blinker means operatively associated with the right front and right rear indicator lights for selectively illuminating the right front and right rear indicator lights in a blinking manner;
   right switch means operatively associated with the right blinker means for controlling the activation of the right blinker means;
   right turn indicator demand means operatively associated with the right switch means for selectively controlling the activation and deactivation of the right switch means; and
   timer means operatively associated with the turn indicator canceling means, the left switch means and the right switch means for deactivating the left and right switch means after a predetermined time period has elapsed, said indicator canceling means triggering the operation of said timer means at predetermined positions of the steering mechanism.

2. The electronic self-canceling turn signal device of claim 1, wherein the turn signal canceling means comprises two Hall Effect sensors and at least one magnet.

3. The electronic self-canceling turn signal device of claim 1, wherein:
   a. the left turn indicator demand means comprises a momentary switch; and
   b. the right turn indicator demand means comprises a momentary switch.

4. The electronic self-canceling turn signal device of claim 3, wherein:
   a. the left turn indicator demand means further comprises left turn switching logic means operatively associated with the left and right momentary switches for sensing the on/off state of the left and right momentary switches so that when the right momentary switch is on, the left turn switching logic means will prevent the left indicator demand means from functioning;
   b. the right turn indicator demand means further comprises right turn switching logic means operatively associated with the left and right momentary switches for sensing the on/off state of the left and right momentary switches so that when the left momentary switch is on, the right turn switching logic means will prevent the right indicator demand means from functioning.

5. The electronic self-canceling turn signal device of claim 1, wherein:
   a. the left blinker means comprises an electronic astable multivibrator; and
   b. the right blinker means comprises an electronic astable multivibrator.

6. The electronic self-canceling turn signal device of claim 1, wherein the timer comprises an electronic monostable pulse generator with a predetermined pulse width.

7. The electronic self-canceling turn signal device of claim 1, wherein:
   a. the left switch means comprises a clocked D type flip-flop switch with the NOT Q output routed to the D input; and
   b. the right switch means comprises a clocked D type flip-flop switch with the NOT Q output routed to the D input.

8. The electronic self-canceling turn signal device of claim 1, further comprising:
   a. the left blinker means comprises an electronic astable multivibrator;
   b. a first left switching transistor-controlled relay circuit operatively associated with the left front light indicator light and the left blinker means;
   c. a second left switching transistor-controlled relay circuit operatively associated with the left rear indicator light and the left blinker means;
   d. the right blinker means comprises an electronic astable multivibrator;
   e. a first right switching transistor-controlled relay circuit operatively associated with the right front indicator light and the right blinker means;
   f. a second right switching transistor-controlled relay circuit operatively associated with the right rear indicator light and the right blinker means; and
   g. vehicle braking indicator means comprising:
      a momentary switch operatively associated with a braking system of the motor vehicle;
      vehicle braking indicator switching logic means operatively associated with the momentary brake switch for sensing the on/off state of the momentary brake switch, operatively associated with the left switch means and the right switch means for receiving an input signal from the left and right switch means for sensing the on/off state of the left or right switch means, and operatively associated with both the second left switching transistor-controlled relay circuit and the second right switching transistor-controlled relay circuit for selectively activating the second left switching transistor-controlled relay circuit and second right switching transistor-controlled relay circuit so that (1) IF the momentary braking switch is closed AND the left switch means is activated, THEN the second right switching transistor-controlled relay will be activated, (2) IF when the momentary braking switch is closed AND the right switch means is activated, THEN the second left switching transistor-controlled relay will be activated, (3) IF when the momentary braking switch is closed AND the left switch means is NOT activated AND the right switch means is NOT activated, THEN the second left switching transistor-controlled relay and second right switching transistor-controlled relay will be activated.

9. The electronic self-canceling turn signal device of claim 1, further comprising hazard indicator means operatively associated with and selectively activating the left blinker means and right blinker means simultaneously.

10. The electronic self-canceling turn signal device of claim 9, wherein the hazard indicator means comprises:

a hazard momentary switch;

an electronic clocked D type flip-flop switch with the NOT Q output routed to the D input;

the hazard momentary switch being operatively associated with the CLOCK input of the flip-flop switch for triggering the flip-flop switch; and the Q output of the flip-flop switch being operatively associated with the left and the right blinker means for selectively activating the left and right blinker means simultaneously.

11. The electronic self-canceling turn signal device of claim 10, further comprising the clocked D type flip-flop switch has its Q output operatively associated with the left switch means and the right switch means for selectively deactivating the left and right switch means.

12. The electronic self-canceling turn signal device of claim 8, further comprising hazard indicator means operatively associated with and selectively activating the left blinker means and the right blinker means simultaneously.

13. The electronic self-canceling turn signal device of claim 12, wherein the braking indicator switching logic means is operatively associated with the hazard indicator means and further comprises a switching logic so that (4) IF the momentary brake indicator switch is closed AND the hazard indicator means is activated, THEN the second left switching transistor-controlled relay is activated and the second right switching transistor-controlled relay is activated.

14. The electronic self-canceling turn signal device of claim 1, further comprising audible indicator means operatively associated with the left blinker means and the right blinker means for activation only when (1) the left blinker means is activated, (2) the right blinker means is activated.

15. The electronic self-canceling turn signal device of claim 14, wherein:

a. the left blinker means comprises:
   an astable multivibrator; and
   electrical sound generating means operatively associated with the astable multivibrator; and, b. the right blinker means comprises:
   an astable multivibrator; and
   electrical sound generating means operatively associated with the astable multivibrator.

16. An electronic self-canceling turn signal device for motor vehicles having left front, left rear, right front, and right rear indicator lights comprising:

left blinker means operatively associated with the left front and left rear indicator lights for selectively illuminating the left front and left rear indicator lights in a blinking manner;

left switch means operatively associated with the left blinker means for controlling the activation and deactivation of the left blinker means;

left turn indicator demand means operatively associated with the left switch means for selectively controlling the activation and deactivation of the left switch means;

right blinker means operatively associated with the right front and right rear indicator lights for selectively illuminating the right front and right rear indicator lights in a blinking manner;

right switch means operatively associated with the right blinker means for controlling the activation of the right blinker means;

right turn indicator demand means operatively associated with the right switch means for selectively controlling the activation and deactivation of the right switch means;

left turn indicator canceling means operatively associated with the steering mechanisms of the vehicle for sensing a left turn motion of the steering mechanism;

right turn indicator canceling means operatively associated with the steering mechanism of the vehicle for sensing a right turn motion of the steering mechanism; and timer means operatively associated with the left turn indicator canceling means and the left switch means, and operatively associated with the right turn indicator canceling means and the right switch means, for deactivating the left switch means and the right switch means after a predetermined time period has elapsed, wherein said left turn indicator canceling means triggers the operation of said timer means at a first predetermined position in said left turn motion of the steering mechanism, and said right turn indicator canceling means triggers the operation of said timer means at a second predetermined position in said right turn motion of the steering mechanism.

17. The electronic self-canceling turn signal device of claim 16, wherein the turn signal canceling means comprises at least one magnet and at least two Hall Effect sensors for determining the left turn motion and right turn motion of the vehicle steering mechanism.

18. The electronic self-canceling turn signal device of claim 17, wherein the turn signal canceling means further comprises switching logic means operatively associated with the Hall Effect sensors and operatively associated with the left switch means and right switch means for selectively deactivating the left and right switching means based upon preselected on/off conditions of the Hall Effect sensor.

19. The electronic self-canceling turn signal device of claim 18, wherein the switching logic means comprises switching logic so that:

a. IF the first Hall Effect sensor is activated AND the second Hall Effect sensor is NOT activated, THEN deactivate the left switching means; and b. IF the first Hall Effect sensor is activated AND the second Hall Effect sensor is activated, THEN deactivate the right switching means.

20. The electronic self-canceling turn signal device of claim 18, wherein the switching logic means comprises switching logic so that:

a. IF the first Hall Effect sensor is activated AND the second Hall Effect sensor is NOT activated, THEN deactivate the right switching means; and b. IF the first Hall Effect sensor is activated AND the second Hall Effect sensor is activated, THEN deactivate the left switching means.

21. The electronic self-canceling turn signal device of claim 16, wherein:
   a. the left turn indicator demand means comprises a momentary switch; and
   b. the right turn indicator demand means comprises a momentary switch.

22. The electronic self-canceling turn signal device of claim 21, wherein:
   a. the left turn indicator demand means further comprises left turn switching logic means operatively associated with the left and right momentary switches for sensing the on/off state of the left and right momentary switches so that when the right momentary switch is on, the left turn switching logic means prevents the left indicator demand means from functioning; and
   b. the right turn indicator demand means further comprises right turn switching logic means operatively associated with the left and right momentary switches for sensing the on/off state of the left and right momentary switches so that when the left momentary switch is on, the right turn switching logic means prevents the right indicator demand means from functioning.

23. The electronic self-canceling turn signal device of claim 16, wherein:
   a. the left blinker means comprises an electronic astable multivibrator; and
   b. the right blinker means comprises an electronic astable multivibrator.

24. The electronic self-canceling turn signal device of claim 16, wherein:
   a. the left switch means comprises a clocked D type flip-flop switch with the NOT Q output routed to the D input; and
   b. the right switch means comprises a clocked D type flip-flop switch with the NOT Q output routed to the D input.

25. The electronic self-canceling turn signal device of claim 16, wherein:
   a. the left blinker means comprises an electronic astable multivibrator;
   b. a first left switching transistor-controlled relay circuit operatively associated with the left front indicator light and the left blinker means;
   c. a second left switching transistor-controlled relay circuit operatively associated with the left rear indicator light and the left blinker means;
   d. the right blinker means comprises an electronic astable multivibrator;
   e. a first right switching transistor-controlled relay circuit operatively associated with the right front indicator light and the right blinker means;
   f. a second right switching transistor-controlled relay circuit operatively associated with the right rear indicator light and the right blinker means; and
   g. vehicle braking indicator means comprising:
      a momentary switch operatively associated with a braking system of the motor vehicle; vehicle braking indicator switching logic means operatively associated with the momentary brake switch for sensing the on/off state of the momentary brake switch, operatively associated with the left switch means and the right switch means for receiving an input signal from the left and right switch means for sensing the on/off state of the left or right switch means, and operatively associated with both the second left switching transistor-controlled relay circuit and the second right switching transistor-controlled relay circuit for selectively activating the second left switching transistor-controlled relay circuit and second right switching transistor-controlled relay circuit so that (1) IF the momentary braking switch is closed, AND the left switch means is activated, THEN the second right switching transistor-controlled relay will be activated, (2) IF when the momentary braking switch is closed AND the right switch means is activated, THEN the second left switching transistor-controlled relay will be activated, (3) IF when the momentary braking switch is closed AND the left switch means is NOT activated, THEN the second left switching transistor-controlled relay and second right switching transistor-controlled relay will be activated.

26. The electronic self-canceling turn signal device of claim 16, further comprising hazard indicator means operatively associated with and selectively activating the left blinker means and right blinker means simultaneously.

27. The electronic self-canceling turn signal device of claim 26, wherein the hazard indicator means comprises:
   a hazard momentary switch;
   an electronic clocked D type flip-flop switch with the NOT Q output routed to the D input;
   the hazard momentary switch being operatively associated with the CLOCK input of the flip-flop switch for triggering the flip-flop switch; and
   the Q output of the flip-flop switch being operatively associated with the left and the right blinker means for selectively activating the left and right blinker means simultaneously.

28. The electronic self-canceling turn signal device of claim 27, further comprising the clocked D type flip-flop switch has its Q output operatively associated with the left switch means and the right switch means for selectively deactivating the left and right switch means.

29. The electronic self-canceling turn signal device of claim 25, further comprising hazard indicator means operatively associated with and selectively activating the left blinker means and the right blinker means simultaneously.

30. The electronic self-canceling turn signal device of claim 29, wherein the braking indicator switching logic means is operatively associated with the hazard indicator means and further comprising switching logic means so that IF the momentary brake indicator switch is closed AND the hazard indicator means is activated, THEN the second left switching transistor-controlled relay is activated and the second right switching transistor-controlled relay is activated.

31. The electronic self-canceling turn signal device of claim 16, further comprising audible indicator means operatively associated with the left blinker means and the right blinker means for activation only when (1) the left blinker means is activated, (2) the right blinker means is activated.

32. The electronic self-canceling turn signal device of claim 31, wherein:
   a. the left blinker means comprises:
      an astable multivibrator; and
      electrical sound generating means operatively associated with the astable multivibrator; and b. the right blinker means comprises:
    astable multivibrator; and
    electrical sound generating means operatively associated with the astable multivibrator.

33. The electronic self-canceling turn signal device of claim 16, wherein the timer means associated with the left switch means and the right switch means comprises switching logic means for sensing the on/off state of the left and right switch means and for sensing the presence of a triggering signal from the left and right turn indicator canceling means so that (1) IF the left canceling means signal is present AND the left switch means is on, THEN the timer will be triggered, (2) IF the right canceling means signal is present AND the right switch means is on, THEN the timer will be triggered.

* * * * *